United States Patent [19]

Figueroa et al.

[11] 3,854,879

[45] Dec. 17, 1974

[54] SAMPLE IDENTIFICATION AND TEST DATA CORRELATION METHOD AND APPARATUS

[75] Inventors: David Richard Figueroa, Pembroke Pines; Guenter Ginsberg, Miami, both of Fla.

[73] Assignee: Coulter Electronics, Inc., Hialeah, Fla.

[22] Filed: July 27, 1973

[21] Appl. No.: 383,437

[52] U.S. Cl. ............... 23/230 R, 23/253 R, 23/259
[51] Int. Cl. .......................................... G01n 1/18
[58] Field of Search ............ 23/253 R, 259, 230 R; 235/151.12, 151.13, 151.35

[56] References Cited
UNITED STATES PATENTS

| 3,565,582 | 2/1971 | Young | 23/230 |
| 3,589,867 | 6/1971 | Heinz et al. | 23/253 X |
| 3,644,095 | 2/1972 | Netheler | 23/253 X |

*Primary Examiner*—R. E. Serwin
*Attorney, Agent, or Firm*—Silverman & Cass, Ltd.

[57] ABSTRACT

In an environment where sample origin and test results require correlation, the number of tests per sample is predetermined, yet variable, the samples can step along one path and the test products (aliquots) step along another path with a step ratio dependent upon the number of tests per sample, the sample carrier is subdivided into indicia bearing receivers (one for each sample), and there is established a step count-distance relationship on the one hand between the original position (transfer station) of the sample, the number of tests per sample and a fixed indicator position, and on the other hand between the original position (receiving station) of the aliquot and the testing station; whereby a presettable counter is preset to correspond to the indicia of the sample receiver in the fixed indicator position at the time of start-up and then will automatically progressively step to attain the indicia value for each sample as its aliquots are being tested and ready for test data printout; the counter feeding the printer the sample indicia at the same time that the printer is printing the test data for that sample.

30 Claims, 3 Drawing Figures

SAMPLE IDENTIFICATION AND TEST DATA CORRELATION METHOD AND APPARATUS

CROSS REFERENCE TO RELATED APPLICATIONS

The present invention is disclosed herein in the environment of an automatic chemical analysis apparatus. To the extent that it may become necessary better to understand the elements and coaction of such chemical analysis apparatus, incorporated herein is United Kingdom patent application 13241/72, filed on Mar. 21, 1972, entitled "Improvements In Or Related To Automatic Chemical Analysis Apparatus" and assigned to the Assignee of the present invention. The corresponding U.S. application is Ser. No. 341,069 filed Mar. 14, 1973.

BACKGROUND OF THE INVENTION

This invention concerns the correlation of the identification of an object or the origin of an object with data pertaining to the object. For example, the name of a patient whose blood sample is in a sample cup near the input end of a blood chemistry analyzer, can be correlated with the chemistry analysis data subsequently obtained from stages within the analyzing apparatus.

In various fields of technology, it is necessary to correlate information obtained at spaced times from relatively separate locations. Methods and apparatuses for such correlation are well known and differ widely in complexity, speed, cost of implementation, degree of automation, and effectiveness of operation.

The description of a blood chemistry environment for the invention herein is merely an example, as are the problems the invention overcomes in such specific environment. The invention is not limited to the example environment, as will become evident from the subsequent description.

On blood chemistry analysis it is necessary to identify a blood sample to be tested with the patient from which the blood was obtained. At one or more times during the blood analyzing operation, it is necessary to correlate test data from the sample with the sample identity or patient. The analyzing process can take many minutes and include several spaced apart testing stations at which different reactions are initiated, subsequent to which different test data results are generated for recording, either at that time or at a still later time, with the intervention of data memory equipment, such as a computer with a memory bank. Quite obviously, if there is an error in the correlation of patient identification, sample identification and sample test data, the wrong patient might be treated for an illness, or a patient improperly diagnosed. To avoid such a dangerous circumstance, various arrangements have been employed.

Typically, it has been considered that elimination of the human error factor by automation, sophistication in electronics and computerization is the answer to positive patient identification and data correlation. Unfortunately, such implementation is costly, even assuming that it resolves the problem, which in some systems has yet to be verified. The problem of correlation still remains a problem for environments and systems which can not afford costly computerization and electronics.

SUMMARY OF THE INVENTION

The invention herein seeks to accomplish object identification and data correlation by use of a relatively inexpensive arrangement of apparatus that employs a few simple steps, including that of initial input by a human operator.

In the environment of blood chemistry analysis, in which each sample is subject to a predeterminable plurality of tests, the samples are incrementally advanced on a first conveyor past a sampling station, and the aliquots of each sample are advanced on a second conveyor incrementally to and through reagent supplying and reaction testing stations. The invention provides for the first conveyor to carry a sample identification number for each sample position. In a simple form of the invention, the human operator selects the number of tests to be performed on each of the next following plurality of samples and enters that number into a test number selector in a control panel, which in turn makes known to the operator a specifically correlated identification number on the sample conveyor. The operator then enters that identification number into an identification counter on the control panel. Next, the operator selects the samples and places them in any desired random order on the first conveyor, but of course in conveyor locations prior to the sampling station. He records on a ledger the oigin (such as patient name) of each sample and the position number on the first conveyor that he has placed the sample.

The correlated identification number placed in the counter depends upon the number of tests and defines an incremental count-distance between the sampling station and the correlated identification number position on the sample conveyor, such that by the time that the samples and aliquots have progressed incrementally to the point that the test data is ready to be obtained, the identification counter will have stepped to the sample position number of the sample for which the test data then is ready for recording. The sample position number and the test data thus are correlated for printout.

The amount of operator participation can be reduced by increasing the electronic surveillance, if the increased cost of the system can be afforded. For example, the correlated identification number can be read automatically and transmitted automatically to the identification counter.

DETAILED DESCRIPTION OF THE PREFERRED EMBODIMENT

Figure 1:
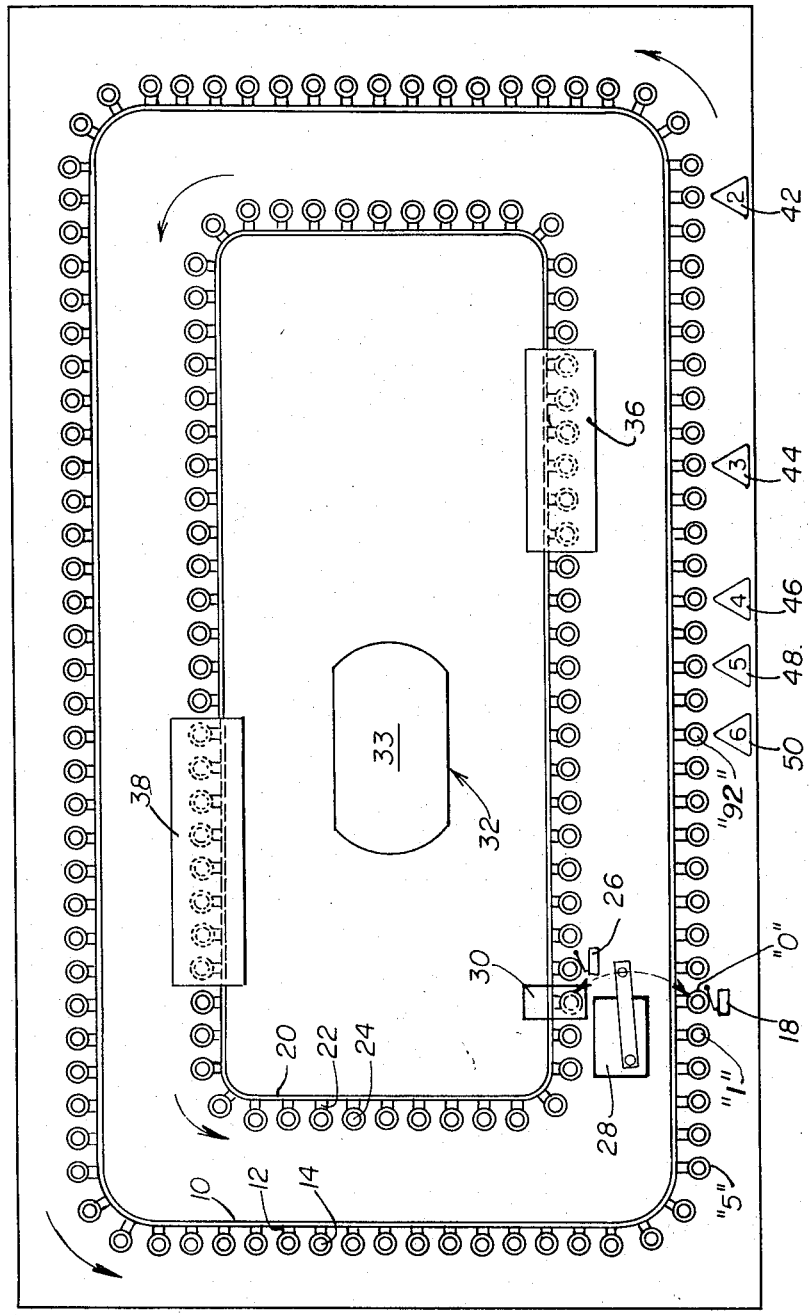
FIG. 1 is a top view of an automated chemistry system which includes apparatus according to the invention.

To be able to appreciate the scope and details of the invention, the environment disclosed herein as an example requires some specific description. FIG. 1 illustrates the top view of an automated chemistry system by which each of a plurality of samples can be subjected to a plurality of tests. The number and type of tests for any one sample is determinable by suitable controls. The time and location that the samples are placed into the system is spaced from the time and location that the samples are diluted and/or treated with reagents. The latter also is spaced in time and location from the ultimate testing of the reacted upon sample aliquots and the recording of the test results. Quite clearly, there must be a correlation between sample identity and test results.

A similar correlation of data could be required in a factory that manufactures appliances or parts that require testing for tolerances or performance; hence, the environment is not limiting.

As shown in FIG. 1, a first conveyor belt 10 is driven counterclockwise in a closed loop around the periphery of the top of the system. The conveyor 10 is provided with a plurality of sample receivers 12, such as brackets, pockets, clamps, etc. that are equally spaced along the belt. The sample receivers are designed to hold the samples, which in this example are to be in test tubes 14. Each of the sample receivers carries a different identifying indicia 16. In the preferred embodiment, a human operator is needed to read the identifying indicia; hence, a simple numeric indicia affixed to the sample receiver is sufficient.

Figure 2:
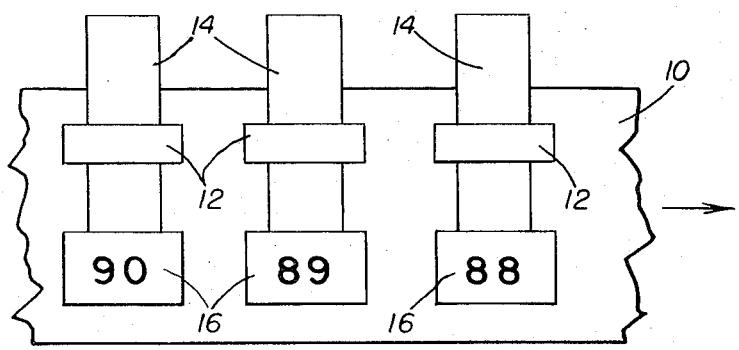
FIG. 2 is a front view of a portion of the sample conveyor.

FIG. 2 shows a front view of a small segment of the conveyor belt 10, three of the sample receivers 12 with three test tubes 14, and the receivers being labeled "90", "89", and "88". In this example, it is to be assumed that there are 100 of the sample receivers numbered from "0" to "99" in a clockwise progression. Thus, the sample receivers will pass a fix location or datum point in advancing numeric progression.

One such fixed location or datum point is a sample transfer station the location of which can be defined by a switch 18 placed adjacent the sample conveyor 10. As the conveyor 10 is being driven counterclockwise (to the right) past the switch 18, each sample receiver 12 will mechanically contact the switch and interrupt the conveyor drive mechanism (not illustrated). After a suitably programmed delay, the conveyor will move again to the right, until again the next receiver interrupts its advance. Many other forms of incremental drive could be employed to step the conveyor one step, i.e., one sample position at a time past the sample transfer station 18.

A second conveyor belt 20 is driven in a closed counterclockwise loop within the loop defined by the sample carrying conveyor 10. The conveyor 20 also is provided with receivers 22 which can hold test tubes 24 or the like. A switch 26 controls the stepping of the belt 20 in a manner similar to that of the switch 18. This inner conveyor 20 receives aliquots of the samples from the outer conveyor 10 by way of a sample transfer mechanism 28, that includes a swinging arm, which carries a pipette and moves sample aliquots from a test tube 14 aligned at the transfer station 18 to a plurality of the sequentially presented reactant tubes 24 at a receiving station which is diagrammatically indicated at reference number 30 and defines a second datum point. Depending upon how many tests are to be performed on a sample, the outer conveyor 10 will remain stationary and the inner conveyor 20 will be stepped, until a sample at the transfer station 18 has had drawn from it the desired number of aliquots and each aliquot is deposited in a different reactant tube 24, then at the receiving station 30.

Figure 3:
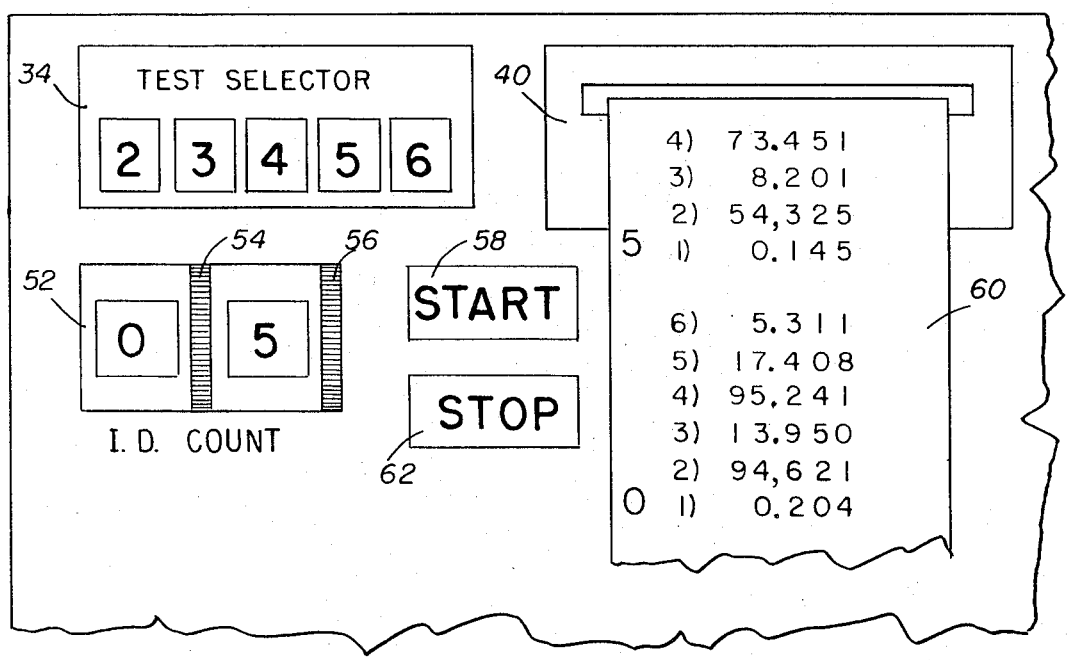
FIG. 3 is a front view of a portion of the control panel.

FIG. 3 illustrates a portion of the control panel 32 of a control console 33 of the system. A test selector 34 contains a number of switch buttons that select from 2 to 6 tests for each sample. If the switch button designated "3" were actuated, the sample tube 14 at the transfer station 18 would remain there until three successive reactant tubes 24 were brought into the receiving station 30 and received an aliquot by way of the transfer mechanism 28. Then, the sample conveyor 10 would advance one step and the next three reactant tubes would be stepped to receive aliquots from the sample tube 14 then at the transfer station 18. This one to three stepping would continue until the system was stopped or a different one of the buttons in the selector 34 actuated, to change the processing progression.

The initially cited United Kingdom patent application discloses the details of the conveyor driving, stepping, transferring and test selection mechanisms, which can be implemented in various ways by those skilled in this art. Also disclosed are the details of a reagent dispensing solution 36 and a colorimetric testing station 38. In the latter, all of the reactant tubes 24, which contained aliquots from a specific one sample tube 14, are tested while the inner and outer conveyor belts are stationary. The resulting test data is fed to a readout mechanism, such as a printer 40 in the control console 33. The correlation of the sample identity and test results for printout purposes was somewhat complex and costly according to the teachings of the cited United Kingdom application and will not be described herein, since the present invention obviates such prior art with a simple method and correlation apparatus, as next described.

Electrically coupled to the test selector buttons 34 is a corresponding group of identifying lamps 42–50 or the like that are fixedly positioned along the path of the first conveyor 10 and define a third datum point. The position of each lamp relative to the transfer station 18 is determined by its test number representation (two through six) and the number of reactant receivers 22 between the receiving station 30 and the input end position of colorimetric testing station 38. In the present example, a reactant receiver will have to be stepped 48 times to move from the receiving station 30 to the first position (input end) of the testing station 38. The two-test lamp 42 is positioned 24 conveyor steps from the transfer station; the three-test lamp 44 is 16 steps; the four-test lamp 46 is 12 steps; the five-test lamp 48 is 10 steps; and the six-test lamp 50 is 8 steps from the transfer station 18. By this simple, yet unique, incremental count (stepping) — distance relationship between the several processing stations 18, 30, and 38 and the identifying lamps 42–50, a specific sample in its test tube 14, mounted in a receiver 12, specifically identified by indicia 16, will step from the transfer station 18 to a position in front of the identifying lamp (one of 42–50) which corresponds to the same lamp chosen by the test selector 34 during the same period of time (steps of the conveyor 20) that the aliquots move from the receiving station 30 to the testing station 38.

For example, if the six-test button were selected in the test selector 34, the six-test lamp 50 would be lit. The lamp 50 is 8 steps from the transfer station 18. The reactant conveyor 20 will step 6 times for each step of the sample conveyor 10, so that there is obtained six aliquots from the sample. Hence, the sample test tube 14 will step 8 positions while its six reactant tubes 24 will step 48 (6 × 8) steps and be within the testing station 38.

The count-distance relationship enables the correlation process with the use of only one more element, a step-identification register or counter 52, which can be located in the control console 33, as shown in FIG. 3. The counter is coupled to respond to the stepping of the sample conveyor 10 so as to increase by one digit for each step of the conveyor 10. The coupling can be by way of the conveyor itself, or its drive mechanism, or by coupling the switch 18 to the counter 52 in a manner that requires no detailing herein. In addition to being automatically advanced in synchronism with the sample conveyor, the step-identifying counter 52 is constructed for manual presetting by the human operator. Thumb wheels 54 and 56, or the like, can be employed to accomplish this function. The manual presetting is to enter into the counter 52 the identifying indicia 16 of the receiver 12 that is in front of the identifying lamp (one of 42–50) which is lit by the test selector 34 at the beginning of a test sequence of a plurality of samples, all requiring the same number of tests.

The printer 40 and the counter 52 are intercoupled such that the identifying value shown by the counter for each step is transmitted to the printer for readout printing in correlation with the test results, as will be explained hereinafter. With respect to the operation of the invention, it should be appreciated that there is no starting point relationship between the two conveyors 10 and 20, nor any receiver indicia 16 which must be at any location at start-up time. Nevertheless, the following description will choose, for simplicity of understanding, the start-up position to be the unique positioning of the "0" numbered sample receiver 12 being at the transfer station 18. Also assumed for simplicity is that the "0" and "5" receivers have samples requiring six tests. In actual practice, any, some, or all of the sample receivers located prior to the transfer station 18 can contain samples and the samples can be put into the receivers at any time before or during system operation. The operator maintains a ledger into which he records the origin of the sample and the indicia of the receiver into which he places that sample. In the present example, it is assumed that the samples are in receivers "5" and "0" prior to start-up and that the operator already has entered the origin-indicia data into his ledger.

The next step is to employ the test selector 34 and switch its button No. 6 for establishing the 1:6 ratio of conveyor drive stepping and the illumination of the six-test lamp 50. Since the six-test lamp is 8 steps from the transfer station 18, and the sample receiver "0" is assumed to be at that station, the sample receiver 12 carrying the indicia "92" will be in front of the lamp 50. The operator then presets the step-identifying counter 52 to the same receiver identification "92" and turns on the system, as by a START button 58 on the control panel 32. Thereupon, the system functions automatically by transferring 6 aliquots from the test tube 14 in the receiver "0" at the transfer station 18 to the first six reactant tubes 24 stepped into the receiving station 30. The sample conveyor 10 then is advanced one step to bring the "1" receiver into the transfer station 18 and the reactant conveyor 20 is stepped six more steps. Since there is no sample in the receivers "1" through "4", aliquot transfer will not actually take place; however, four more of the 1:6 stepping will be accomplished as the conveyor subsequently steps to "5". During such incremental advancing of the reactant conveyor 20, the six-test tubes 24 carrying the aliquots from the "0" sample will pass through the reagent dispensing station 36 and receive different reagents for accomplishing the six selected tests. Also, the counter 52 will step from "92" to "97". When the receiver "5" is brought into the transfer station 18, the counter 52 will register "97" and the receiver "97" will be in front of the six-test lamp 50. The latter fact verifies the continuing count-distance relationship. Moreover, it shows that it is not pertinent if the "0" receiver had any sample.

The reactant conveyor stepping and aliquot transfer for sample "5" is accomplished and the system progresses until a total of eight separate stepping operations have been accomplished by both conveyors 10 and 20. At that time, the counter 52 registers "0" (92+8=100=0) and transmits the "0" sample identification to the printer 40. At the same time, all six of the reactant tubes 24 from the "0" sample are within the testing station 38. The tests then are accomplished on those six aliquots and the test results fed into the printer 40, which prints together both the sample identification "0" and the six-test results in an easily correlated format, such as shown in FIG. 3 on the tape 60. In a similar manner, the system steps 5 more times, until the counter 52 attains the "5" value and the aliquots from that sample "5" are in the test station 38. Thereupon the correlation for printout again is available. The illustration in FIG. 3 shows such relationship with the counter 52 in the "5" position and the printer 40 in the process of printing the test results for the "5" sample. At a subsequent time the operator will associate the sample identification in his ledger with that on the tape 60.

If there were no more of the six-test samples then to be processed, the operator would stop the system, as by a STOP switch 62, and subsequently select the next batch of samples having a common number of tests, such as three. At that time, the "13" receiver would be at the transfer station 18, which is an unimportant fact. Adjacent the six-test lamp 50 would be the "5" receiver, which again verifies the system operation. Of present importance is the fact that adjacent the three-test lamp 44 is the sample receiver "97", which number the operator will preset into the counter 52. He also will put the samples into any of the receivers from "13" and "higher", and make the appropriate ledger entries. The three-test selector in the selector 34 is energized and the system again becomes automatic, with a 1:3 stepping relationship. The counter 52 will progress until the aliquots of each certain sample are ready for printout At that time the counter will register the sample identification number of that certain sample.

In the just briefly described three-test operation, it was mentioned that the operator entered the preset value into the counter before test selection via the control panel test selector 34. This is not as contrary to the earlier described operation as might at first seem. An electric coupling between the test selector 34 and the group of identifiers 42–50 is not essential, it is only convenient. If the identifiers 42–50 merely were arrowheads located at their respective positions, with their respect test number value labeled next to the arrowhead, the operator easily could recognize the correct carrier indicia for a specific test selection, without need for the lighting of a lamp.

If more automation were desired, the identifiers 42–50 could comprise indicia readers, such as optical or magnetic, which would read the indicia 16 presented in a compatible manner, i.e., optic or magnetic on the receivers 12. The thus read indicia 16 automatically would be transmitted to the counter 52 for its automatic presetting; all at the time that the operator activates the test selector 34.

It is believed that those skilled in the art will be able to appreciate the teachings of the invention from the foregoing and be able to practice and also adapt same to various environments, while remaining within the scope of the invention.

What is sought to be protected by United States Letters Patent is:

1. A method for the semi-automatic correlation of the identification of a sample and test data derived from the sample in the environment of a system in which each of a plurality of the samples is in a sample receiver which incrementally advances along a first path passing a first datum point, and test portions obtained from each sample incrementally advance along a second path passing a second datum point to a testing station, the incremental distance between the second datum point and the testing station being known; the steps comprising:

defining the number of tests to be performed on each sample;

establishing a ratio between the rates of the incremental advancing along the second and first paths to be the same as the number of tests per sample;

locating a third datum point along the first path;

providing a progression of indicia on the sample receivers;

presetting a stepping register, having the same progression of indicia as the sample receivers, to the indicia of the sample receiver positioned at said third datum point, prior to start-up of the system; and synchronizing the stepping of the register with the incremental advancing of the sample receivers along the first path;

whereby, after the start-up of the system, all of the sample test portions will reach the testing station at the same time that the register will step to the indicia of the sample receiver from which the test portions were obtained, so that the sample identity and test portion derived data is correlated.

2. A method according to claim 1 in which said step of locating a third datum point is accomplished by defining an identifying incremental distance between the first and third datum points, said identifying incremental distance being dependent upon said ratio and the incremental distance between the second datum point and the testing station.

3. A method according to claim 1 in which said step of defining the number of tests per sample is accomplished by an operator who, by inputting the number of tests into a control center of the system, effects said step of establishing a ratio.

4. A method according to claim 3 in which said step of locating is accomplished by defining an identifying incremental distance between the first and third datum points, said identifying incremental distance being dependent upon said ratio and the incremental distance between the second datum point and the testing station.

5. A method according to claim 4 in which said step of locating a third datum point is accomplished automatically by the system as a result of said inputting of the number of tests, the identifying incremental distance being the quotient of the incremental distance between the second datum point and the testing station divided by the number of tests per sample.

6. A method according to claim 1 in which said step of locating a third datum point is accomplished by an operator who determines the identifying incremental distance by dividing the incremental distance between the second datum point and the testing station by the number of tests per sample.

7. A method according to claim 1 in which said step of presetting is accomplished manually by an operator.

8. A method according to claim 7 in which said step of providing indicia on the sample receivers is accomplished such that the indicia is manually readable by the operator.

9. A method according to claim 1 in which said step of presetting is accomplished automatically by a transmitting of the indicia from the sample receiver at the third datum point to the stepping register.

10. A method according to claim 1 which further comprises the step of conveying to a readout means the sample testing data from the testing station and the associated sample receiver indicia from the stepping register, both said data and said indicia being simultaneously available by virtue of said methos.

11. A method according to claim 10 which further comprises the step of manually recording the origin of each sample and the indicia of the receiver of each specific sample, and matching the indicia of the recording with the same indicia from the readout means and thereby correlating the sample identification with the derived test data.

12. A method according to claim 1 in which said step of defining the number of tests per sample is changeable for several different numbers of tests, each such change in defining causing related changes in the ratio obtained by said step of establishing and related changes in the location of the third datum point by said step of locating.

13. Apparatus for the correlation of the identification of a sample and test data derived from the sample in the environment of a system in which each of a plurality of the samples is in a sample receiver which incrementally advances along a first path passing a first datum point, and a determinable number of test portions obtained from each sample incrementally advance along a second path passing a second datum point to a testing station for performing that same determinable number of tests per sample, the incremental distance between the second datum point and the testing station being known; apparatus comprising:

means for establishing a ratio between the rates of the incremental advancing of the test portions and samples along the second and first paths, respectively, to be the same as the determinable number of tests per sample;

means for locating a third datum point along the first path;

means for providing a progression of indicia on the sample receivers;

a stepping register having the same progression of indicia as the sample receivers and presettable to the indicia of the sample receiver positioned at said third datum point, p prior to start-up of the system; and means synchronizing the stepping of the register with the incremental advancing of the sample receivers along the first path;

whereby, after such presetting of the register and the start-up of the system, all of the sample test portions will reach the testing station at the same time that the register will step to the indicia of the sample receiver from which the test portions were obtained, so that the sample identity and test portion derived data is correlated.

14. Apparatus according to claim 13 in which said means for locating a third datum point includes means for defining an identifying incremental distance between the first and third datum points such that said identifying incremental distance is dependent upon said ratio and the incremental distance between the second datum point and the testing station.

15. Apparatus according to claim 14 in which said means for locating a third datum point includes at least one indicator element oriented adjacent the first path at the position of said third datum point.

16. Apparatus according to claim 1 in which said means for establishing a ratio includes means for inputting the determinable number of tests into a control center of the system.

17. Apparatus according to claim 16 in which said means for locating a third datum point operates automatically and is coupled to be responsive to said means for inputting of the determinable number of tests in such a manner that said third datum point is located from said first datum point an identifying incremental distance which is the quotient of the incremental distance between the second datum point and the testing station divided by the number of tests per sample.

18. Apparatus according to claim 13 in which said stepping register is constructed to be preset manually by an operator.

19. Apparatus according to claim 18 in which said indicia on the sample receivers comprise indicia manually readable by the operator.

20. Apparatus according to claim 13 in which said stepping register is coupled to be automatically preset by automatically receiving transmission of the indicia from the sample receiver at the third datum point.

21. Apparatus according to claim 13 which further comprises a readout means coupled to receive the testing data from the testing station and the associated sample receiver indicia from the stepping register, both said data and said indicia being simultaneously available to said readout means by virtue of said apparatus.

22. Apparatus according to claim 13 in which said means for establishing a ratio is constructed and arranged to provide several different of said ratios, one at a time, each said ratio corresponding to one of several different determinable number of tests, and each such ratio being accompanied by a related change in the location of the third datum point by said means for locating the third datum point.

23. Apparatus for sample testing and correlation of the identification of a sample and test data derived from that sample, said apparatus comprising:

a first and a second incrementally driven conveyor;

means for synchronously driving said conveyors along first and second paths, respectively;

means on said first and second conveyors for receiving, respectively, a plurality of samples and a plurality of aliquots, there being a determinable number of aliquots for each sample;

said receiving means on said first conveyor containing indicia such that each sample can be identified, the indicia being in a progression along said first conveyor;

first and second datum points located, respectively, adjacent said first and second conveyor paths;

an aliquot testing station positioned adjacent said second path at a known incremental distance along said second path from said second datum point;

means for controlling said driving means such that it synchronizes the driving of said conveyors in proportion to the number of aliquots per sample;

means for inputting into said controlling means a value for the number of aliquots per sample;

means, responsively coupled to said inputting means, for locating a third datum point adjacent said first path; and a presettable stepping register having the same progression of indicia as the indicia of said receiving means along said first conveyor, said register being coupled to be synchronously stepped to match the incremental driving of said first conveyor; said apparatus, when said inputting means has supplied said controlling means with a value number of aliquots and said register is preset to the indicia value of the receiving means that is positioned adjacent said third datum point, being enabled to automatically proceed incrementally such that all of the aliquots of a specific sample will reach said testing station at the same time that said register will step to the indicia of the receiving means of that specific sample, so that sample identification and its aliquot test data then can be correlated.

24. Apparatus according to claim 23 in which there is readout means coupled to both said stepping register and said testing station for receiving coterminously the sample receiver indicia and the aliquot test data derived from the same sample.

25. Apparatus according to claim 24 in which said first and second datum points are, respectively, sample transfer and aliquot receiving stations.

26. Apparatus according to claim 23 in which said means for locating a third datum point includes means for defining an identifying incremental distance between the first and third datum points, such that said identifying incremental distance is dependent upon said number of aliquots per sample and the incremental distance between the second datum point and the testing station.

27. Apparatus according to claim 26 in which said stepping register is constructed to be preset manually by an operator and said indicia on the sample receivers comprise indicia manually readable by the operator.

28. Apparatus according to claim 27 in which said means for locating a third datum point includes at least one indicator element oriented adjacent the first path at the position of said third datum point.

29. Apparatus according to claim 25 in which said means for defining an identifying incremental distance is constructed to define effectively such distance as the quotient of the known incremental distance between said second datum point and said testing station divided by the number of aliquots per sample.

30. Apparatus according to claim 23 in which said conveyor driving means, controlling means, inputting means and locating means all are constructed, arranged and intercoupled for response to the inputting of several different numbers of aliquots for different samples; whereby, proportionately different drive synchornizations and third datum point locations are obtained for different samples.

* * * * *